Figure 1:
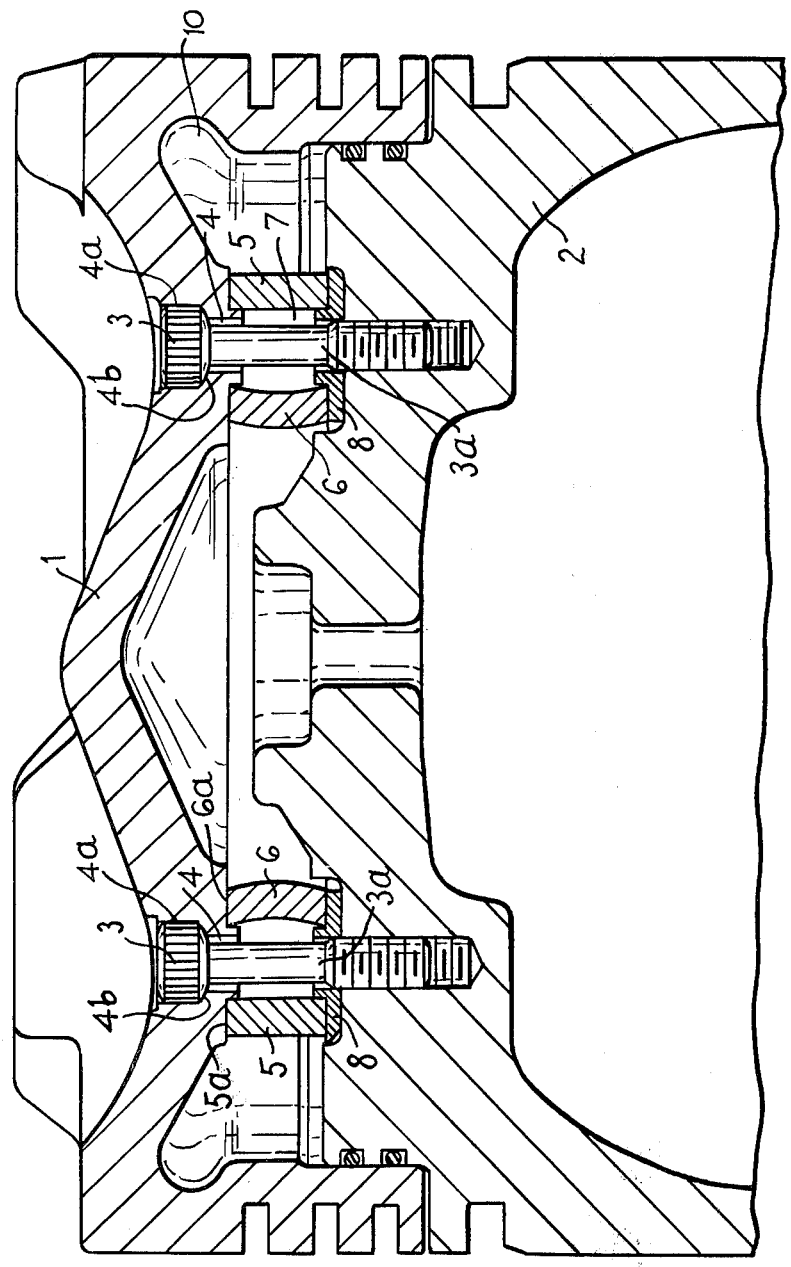

United States Patent [19]

Speaight

[11] 4,114,519
[45] Sep. 19, 1978

[54] PISTONS

[75] Inventor: David Clement Speaight, Lymington, England

[73] Assignee: Wellworthy Limited, Lymington, England

[21] Appl. No.: 729,098

[22] Filed: Oct. 4, 1976

[30] Foreign Application Priority Data

Oct. 8, 1975 [GB] United Kingdom ............... 41338/75

[51] Int. Cl.² .............................................. F16J 1/00
[52] U.S. Cl. ........................................ 92/221; 92/186; 92/215; 92/256
[58] Field of Search ................... 92/84, 186, 215, 221, 92/211, 220, 216, 256, 247; 123/41.35, 193 P

[56] References Cited

U.S. PATENT DOCUMENTS

| 1,226,631 | 5/1917 | Bie ...................... 123/41.35 |
| 1,306,839 | 6/1919 | Schneider ............... 92/186 |
| 1,377,106 | 5/1921 | Welch .................... 92/84 |
| 1,439,109 | 12/1922 | Kuhn .................... 92/221 X |
| 1,825,163 | 9/1931 | Schweter ............... 92/186 X |
| 1,921,996 | 8/1933 | Hooydonk .............. 92/247 X |
| 1,947,701 | 2/1934 | Farmer .................. 92/256 |
| 2,417,887 | 3/1947 | Schmidt ................. 92/247 |
| 2,720,193 | 10/1955 | Maybach ................ 92/186 X |
| 3,382,772 | 5/1968 | Kampert et al. ......... 92/247 X |
| 3,465,651 | 9/1969 | Tromel .................. 92/186 |
| 3,877,351 | 4/1975 | Barfiss ................... 92/186 X |

FOREIGN PATENT DOCUMENTS

| 774,367 | 9/1934 | France ...................... 92/221 |
| 216,050 | 8/1908 | Fed. Rep. of Germany ........ 123/41.35 |

Primary Examiner—Irwin C. Cohen
Attorney, Agent, or Firm—Brisebois & Kruger

[57] ABSTRACT

A piston having a crown and a body connected together by bolts. The bolts pass through an annular gap defined by a pair of concentric ring members located between the crown and the body. One of the ring members is relatively resilient and the other ring member is relatively rigid. Such a construction reduces fretting between the crown and the body when the piston is in operation in an engine.

7 Claims, 2 Drawing Figures

PISTONS

The present invention relates to pistons and more particularly to pistons wherein the crown is a separate part attached to the piston body.

The crown which is exposed to the combination gases of an engine, is made from a heat-resisting material, for example steel, and is usually bolted to the lower body portion which houses the gudgeon pin and provides the bearing area which slides in the cylinder of the engine.

Because a considerable heat flow occurs from the engine combustion chamber into the piston crown, a circulation of a cooling medium, commonly the engine lubricating oil, is arranged in a space between the piston crown and body so that the latter operates at a substantially uniform temperature. However, a considerable temperature difference exists between the upper and lower surfaces of the crown.

The temperature difference or gradient through the crown gives rise to a considerable tendency for the crown to arch relative to the face of the body to which it is attached and difficulties therefore arise both in bending the attachment bolts and also in providing a seating area between the crown and body which will carry the gas pressure loading without fretting due to the movement resulting from the arching.

The crown may be attached to the piston body by means of a ring of bolts having their heads located in recesses in the top of the crown and passing downwardly through apertures into the piston body. However, with such a construction fretting may occur resulting from tilting of the mating face of the crown when bolted to the piston body due to the thermal arching of the crown, as mentioned above.

It is an object of the present invention to provide an improved arrangement wherein the tendency to fretting between the crown and the piston body is reduced and the bearing pressures on mating faces between the crown and the body are maintained.

The present invention consists in a piston having a separate crown attached to the piston body by means of bolts passing through the piston crown into the piston body, wherein two concentric ring members are provided between the crown and the body and define between them an annular gap through which pass the bolts from the underside of the crown into the piston body, and wherein one of said ring members is relatively rigid and the other of said ring members is resilient.

The resilience may be imparted to the one ring member by curving the ring in the axial direction so that the ring section will buckle slightly when under load. Alternatively, particularly for smaller sizes of pistons, greater resilience can be obtained by slitting the ring horizontally with overlapping slots, or by some other configuration. In either case, the resilient ring is machined to a slightly greater axial length that the non-resilient ring.

The resilient ring may be either the outer ring or the inner ring of the concentric pair.

Figure 2:
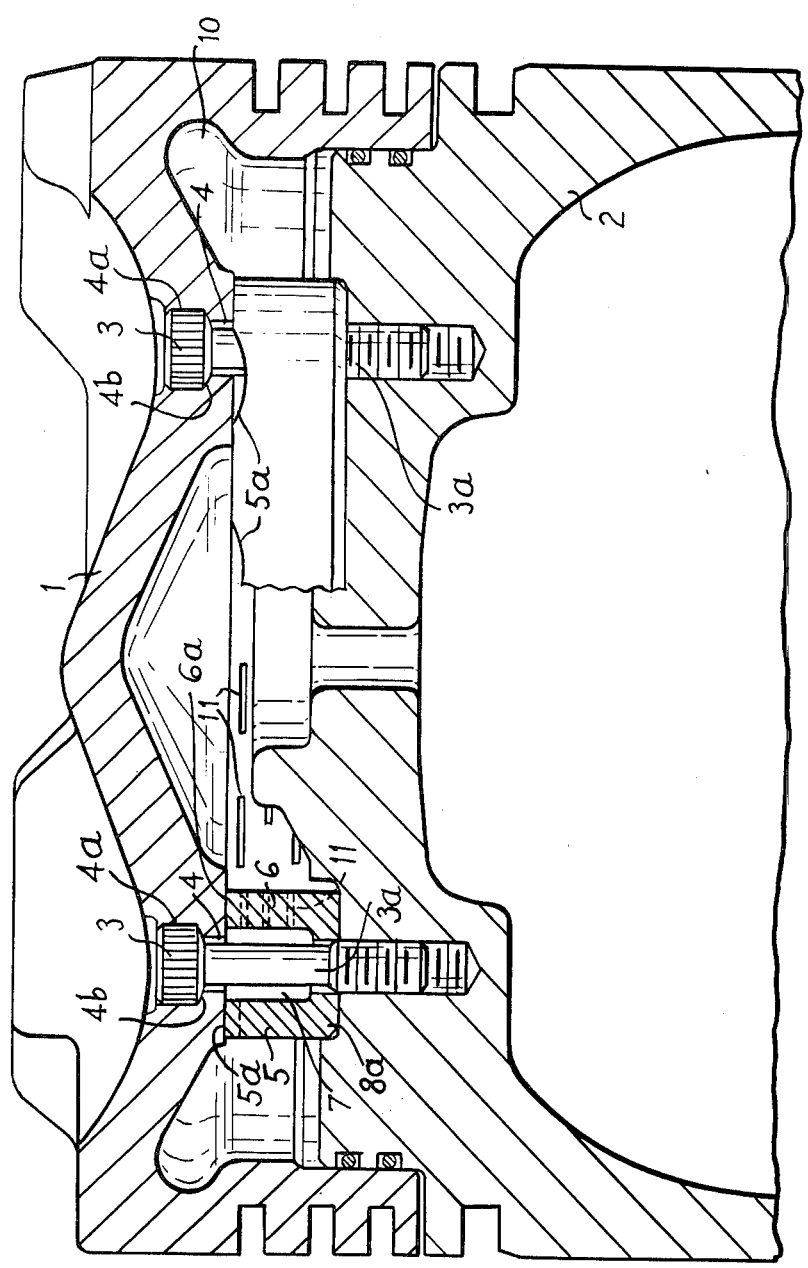

The invention will now be further described, by way of example, with reference to the accompanying drawings, in which:

FIG. 1 is a cross-section through part of one embodiment of piston according to the invention, and FIG. 2 is a similar view of a further embodiment.

Referring to FIG. 1, a piston comprises a crown 1 of a heat-resistant material, such as steel or a heat-resistant alloy, which is attached to a piston body 2, which may be formed of a lighter material, for example an aluminium alloy. The attachment is made by means of bolts 3 which pass downwardly through apertures 4 in the piston crown and are threaded into the top of the piston body. The heads of the bolts 3 are located in recesses 4a in the top of the crown 1 and the underside of the bolt heads are curved and rest on spherical seatings 4b. Two concentric annular ring members 5 and 6 are provided between the piston crown and the piston body and define between them an annular space 7 through which pass the shanks 3a of the securing bolts 3. The ring members 5 and 6 may be made of steel and the outer ring member 5 is plain and relatively rigid. The inner ring member 6 is of slightly greater axial length and is curved in its axial direction in order to provide it with a degree of resilience. The ring members are clamped between the underside of the piston crown and the top of the piston body when the securing bolts 3 are tightened and, to this end, seatings 5a, 6a are provided on the underside of the crown, and a pressure bearing plate 8 is provided on the top of the body, to receive and locate the rings 5 and 6 on the piston body.

It will be understood that when the bolts 3 are tightened, the resilient ring 6 will compress until the crown 1 is clamped down firmly on the non-resilient plain ring 5. However, when the piston crown increases in temperature during operation of the piston and tends to arch relative to the piston body, it will pivot on the plain ring 5 and the resilient ring 6 will still support a proportion of the load and therefore reduce the tendency to fretting. The curved underside of the bolt heads and the spherical seatings 4b for the bolts 3 tend to avoid bending of the bolts when the crown takes up its arched form.

In this embodiment, the plain ring is shown as the outer concentric ring, although it could be the inner concentric ring and the resilient ring the outer ring. The rings may be made from a material with a coefficient of thermal expansion which is lower than that of the steel securing bolts 3 so that some degree of temperature compensation is provided.

As shown, the underside of the crown 1 is provided with an annular cavity 10 through which cooling oil can circulate. This cooling oil may also pass through the spacer rings 5 and 6 into the annular space 7 by providing drainage channels across the top face of the rings.

FIG. 2 shows a further embodiment of piston wherein corresponding parts bear the same reference numerals. In this embodiment the inner ring 6 is made resilient by providing it with horizontally extending overlapping slots 11. Moreover the ring members 5 and 6 are made integrally with the bearing plate 8a, e.g. by machining from a single piece of material. The outer ring member 5 is also provided with drainage channels 5a across its top face to allow cooling oil to pass into the annular space 7. This oil can also pass through the slots 11 on the ring 6.

The other constructional features of this embodiment are similar to the embodiment of FIG. 1.

What is claimed is:

1. An internal combustion engine piston comprising:
   a piston body,
   a separate crown,
   a plurality of bolts for attaching said crown to said body, two heat resistant metallic concentric ring members each disposed in abutting engagement between the adjacent faces of said crown and said body inwardly of the periphery thereof and so as to define an annular gap between said ring members, said bolts passing through said annular gap, one of said ring members being relatively rigid, and the other of said ring members being resilient, said ring members cooperating to permit variation in the alignment of said two adjacent faces resulting from thermal conditions arising during the operation of said piston and to support said crown to withstand gas pressures during operation of said piston.

2. A piston as claimed in claim 1, wherein the resilient ring member is of curved form in the axial direction.

3. A piston as claimed in claim 1, wherein the resilient ring member is provided with circumferentially extending slots.

4. A piston as claimed in claim 1, wherein the axial length of the resilient ring member is slightly greater than the axial length of the non-resilient ring member.

5. A piston as claimed in claim 1, wherein the resilient ring member is the inner ring member of the concentric pair.

6. A piston as claimed in claim 1, including an integral structure comprising said two ring members and a pressure bearing member which supports said ring members with respect to the piston body.

7. A piston as claimed in claim 1, wherein the ring members are made of a material having a lower coefficient of thermal expansion than the material of which the plurality of bolts are made.

* * * * *